(12) United States Patent
Sheldon-Coulson et al.

(10) Patent No.: US 11,802,054 B2
(45) Date of Patent: Oct. 31, 2023

(54) VESSEL TO PROVIDE CARBON DIOXIDE FROM CALCIUM CARBONATE

(71) Applicant: Lone Gull Holdings, Ltd., Portland, OR (US)

(72) Inventors: Garth Alexander Sheldon-Coulson, Portland, OR (US); Brian Lee Moffat, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

(21) Appl. No.: 18/110,868

(22) Filed: Feb. 16, 2023

(65) Prior Publication Data

US 2023/0264962 A1    Aug. 24, 2023

Related U.S. Application Data

(60) Provisional application No. 63/312,024, filed on Feb. 20, 2022.

(51) Int. Cl.
*C01B 32/50* (2017.01)
*B01J 8/00* (2006.01)

(52) U.S. Cl.
CPC ............. *C01B 32/50* (2017.08); *B01J 8/008* (2013.01)

(58) Field of Classification Search
CPC .................................. C01B 32/50; B01J 8/008
USPC ........................................................ 423/437.1
See application file for complete search history.

(56) References Cited

U.S. PATENT DOCUMENTS

2017/0342004 A1* 11/2017 Eisaman ................. C07C 41/09

FOREIGN PATENT DOCUMENTS

KR           102143382 B1 *  8/2020

OTHER PUBLICATIONS

KR102143382B1—English Translation (Year: 2020).*

* cited by examiner

*Primary Examiner* — Anita Nassiri-Motlagh
(74) *Attorney, Agent, or Firm* — FULWIDER PATTON LLP

(57) ABSTRACT

Disclosed is an apparatus, system, and method, by which a plentiful supply of carbon dioxide may be provided to a fuel-conversion process operated in the deep sea far from shore thereby permitting a conversion of electrolysis-generated hydrogen gas into a carbonaceous liquid fuel. Because the cost and complexity of storing and transporting liquid fuels by ship is substantially simpler and less costly than is transporting gases, the present invention is expected to promote the extraction and distribution of energy harvested from the deep sea by permitting it to be accomplished with reasonable logistical complexity and at a reasonable and low cost.

5 Claims, 12 Drawing Sheets

VESSEL TO PROVIDE CARBON DIOXIDE FROM CALCIUM CARBONATE

CROSS-REFERENCES TO RELATED APPLICATIONS

This application claims priority to U.S. Provisional Patent Application No. 63/312,024, filed Feb. 20, 2022, the content of which is incorporated by reference herein in its entirety.

BACKGROUND

Technologies have been disclosed in the prior art which can efficiently extract energy from natural sources such as wind, waves, tidal, and thermal gradients. A limited number of these technologies are capable of operating in parts of the ocean far from land, thereby gaining access to a significant and infrequently tapped global energy resource. One such "deep-sea-capable" technology, the inertial hydrodynamic wave engine, extracts energy from deep-sea ocean waves and has been disclosed in U.S. Pat. No. 11,118,559, the content of which is incorporated herein by reference. While these deep-sea renewable energy technologies can extract energy from natural sources, and typically use that extracted energy to generate local supplies of electrical power, their distance from land precludes the possibility of sending their generated electrical power to land via a subsea power cable.

As an alternative to sending their electrical power to shore, such deep-sea renewable-energy technologies and devices have the option of using all, or a portion, of the electrical power that they generate to electrolyze water and to thereby produce hydrogen gas, which is a promising renewable fuel. And, though hydrogen gas produced with renewable energy at sea can be stored within or adjacent to deep-sea renewable energy devices, and thereafter collected and transported to land, the cost of doing so tends to be high since hydrogen gas must typically be stored and transported as a compressed gas, requiring relatively voluminous, thick-walled, and expensive containers, or else by another hydrogen storage method having its own associated costs.

Currently, the conversion of hydrogen gas to a liquid fuel is impractical from an economic standpoint. The conversion of hydrogen gas to liquid ammonia benefits from the abundance of nitrogen in the atmosphere. However, it is made difficult by the size and energy consumption of the machines required to implement the most common industrial process by which ammonia is synthesized, namely the Haber-Bosch method. While arguably the most preferred method of ammonia production on land, the capital, logistical and energy costs that would be associated with its execution at sea far from land would be expected to increase the cost of the resulting liquid ammonia to a large degree.

The conversion of hydrogen gas to a liquid carbonaceous fuel like ethanol or methanol would benefit from relatively simple and inexpensive production methods which would be amenable to implementation and operation at sea. However, it is made difficult by the absence of a readily available source of carbon. The collection and purification of carbon dioxide present in the atmosphere is not currently practical from a cost or energy efficiency perspective. Similarly, the collection and purification of carbon dioxide present in the sea, e.g. as dissolved carbon dioxide and bicarbonate, is not yet practical from a cost or energy efficiency perspective.

Therefore, if the abundant renewable energies available in the deep sea are to be harvested and used to displace energy produced by the burning of fossil fuels, then there exists a need for either a simpler and cheaper method and/or process of combining atmospheric nitrogen and electrolysis-generated hydrogen gas to produce liquid ammonia, or an inexpensive and abundant source of carbon at sea far from land.

The logistical and cost efficiencies with which energy may be captured from deep-sea waves and then transported to shore where it can be consumed can be improved if hydrogen gas created at sea can be locally converted into a liquid instead of a gaseous fuel. Hydrogen gas might be converted into a liquid carbonaceous fuel, such as methanol, ethanol, or gasoline, at sea, however, there are no readily available sources of carbon in the sea or the atmosphere.

There exists a need for a method, system, and apparatus, that will provide a low-cost and logistically efficient source of carbon, e.g. carbon dioxide, at sea, which would then provide an opportunity to convert a difficult-to-transport gaseous fuel like hydrogen into an easy-to-transport liquid fuel like methanol. The practical provision of a carbon source at sea, especially a source of carbon dioxide, and especially a net-carbon-neutral or net-carbon-negative source of such carbon dioxide (from the perspective of atmospheric carbon dioxide levels), will promote the cost-effective capture and distribution to terrestrial consumers of energy captured from sources in the deep sea.

SUMMARY OF THE INVENTION

Disclosed is a "carbon-dioxide (CO2) supply vessel" which constitutes a novel method, system, and apparatus, with which plentiful supplies of carbon dioxide can be made available at sea, far from any shore, where it can be used locally to synthesize a liquid carbonaceous fuel from hydrogen gas, thereby permitting renewable energy extracted and collected at sea to be stored and transported as a liquid instead of a gas. A carbonaceous liquid fuel such as methanol (CH3OH) is more-conveniently stored and transported than a gaseous one, which would be expected to facilitate efforts to harvest renewable energy from the deep sea and return it to terrestrial communities and consumers at an affordable cost.

Plentiful supplies and sources of carbon-rich substances are readily available on land, as well as in and/or under the coastal waters near land. The present invention involves gathering such a carbon-rich material on or near land, storing that material in a container on a vessel, and then transporting that container of carbon-rich material to a remote site in the sea where renewable energy is being harvested. At such a site of renewable energy production, the extracted renewable energy (e.g. wave energy) is converted into electrical power, and that electrical power is then used to produce hydrogen gas through an electrolysis of water.

The CO2 supply vessel disclosed herein facilitates the utilization of existing and plentiful supplies and sources of carbon dioxide which may be found around the world in the form of calcium carbonates. Calcium carbonate is a chemical compound with the formula CaCO3.

Deposits of CaCO3 comprise approximately 4% of the earth's crust. CaCO3 is the predominant component and/or part of natural geological materials including, but not limited to: limestone (typically found on land), lime sands (found on land and on the seafloor), CaCO3 sands (typically located under the sea on the continental shelves), chalk, marble, tufa, and travertine. CaCO3 is found in rocks in various mineral states, including, but not limited to: aragonite, calcite, dolomite, and vaterite.

CaCO3 used in industrial processes is typically obtained and extracted through the mining, quarrying, and/or dredging of minerals, sands, sediments, and/or earth, rich in CaCO3.

In port, and/or adjacent to land, and/or at sea, a CO2 supply vessel receives a supply of a calcium-carbonate-rich material, such as chalk, which is placed within a CaCO3 reaction chamber. The CO2 supply vessel then sails, cruises, and/or transits to a position in the sea nearer to where renewable energy is being harvested and used to produce hydrogen gas. After its deployment to a site of renewable energy production, the CO2 supply vessel receives quantities, portions, and/or supplies, of hydrochloric acid (HCl), typically as an aqueous solution of hydrochloric acid, e.g. as a 36% weight-by-weight HCl solution, which it stores onboard the vessel.

When supplied with HCl, and when its supply of CaCO3 is not yet fully consumed, the CO2 supply vessel periodically, incrementally, and/or continuously, adds, introduces, sprays, injects, and/or pours, portions, and/or streams, of HCl onto and/or into the CaCO3 stored within the vessel's CaCO3 reaction chamber, bin, enclosure, reaction vessel, and/or tank. When combined with HCl, CaCO3 will tend to react chemically with the HCl resulting in a release of gaseous CO2, liquid water (H2O), and dissolved calcium chloride (CaCl2). The evolved CO2 gas is collected and stored in a pressurized container. The resulting water tends to drain down and through the CaCO3 and is then collected at a bottom of the CaCO3 reaction chamber and discharged into the sea. The resulting CaCl2 tends to be collected and discharged with the effluent water.

When needed, other vessels supporting, if not directly executing, the chemical conversion of hydrogen gas and CO2 to a carbonaceous fuel, such as methanol, will offload a quantity of compressed CO2 to enable such chemical conversions and the resulting production of liquid fuels.

The entire process that includes (1) the production of hydrochloric acid from seawater; (2) the return to the ocean of the concomitant alkaline stream; (3) the reaction of said hydrochloric acid with CaCO3; (4) the return to the ocean of the primary non-gaseous products of said reaction (namely CaCl2 and water); (5) the use of the carbon dioxide liberated during said reaction to synthesize a liquid fuel; and (6) the later combustion in the atmosphere of said liquid fuel (releasing carbon dioxide) is, perhaps counterintuitively, a process that removes CO2 from the atmosphere on the whole and sequesters it in the ocean. This is due to fact that the described process increases, on net, the total alkalinity of ocean waters through the return of (conservative) calcium cations to those waters, cations which were typically removed from those waters by shell-building organisms which sank to the seafloor thereby storing them as CaCO3 deposits. An increase in the total alkalinity of ocean waters increases the buffering capacity of said waters and establishes a new equilibrium for the carbonate system wherein there is a greater tendency for atmospheric CO2 to be harmlessly dissolved (e.g., without acidifying the ocean). Accordingly, the production (and subsequent combustion) of fuels synthesized by using CO2 liberated in the manner of this disclosure is, on the whole, a net-carbon-negative process from the perspective of atmospheric CO2 levels. And, because CaCO3 deposits typically consist of the shells of long-dead organisms, fuels synthesized by using CO2 liberated in the manner of this disclosure can be accurately described as "carbon-negative fossil fuels."

DETAILED DESCRIPTIONS OF THE EMBODIMENTS

For a fuller understanding of the nature and objects of the invention, reference should be made to the preceding Summary of the Invention, taken in connection with the accompanying drawings. The following figures offer explanatory illustrations. The following figures, and the illustrations offered therein, in no way constitute limitations, either explicit or implicit, on and/or of the present invention.

Figure 1:
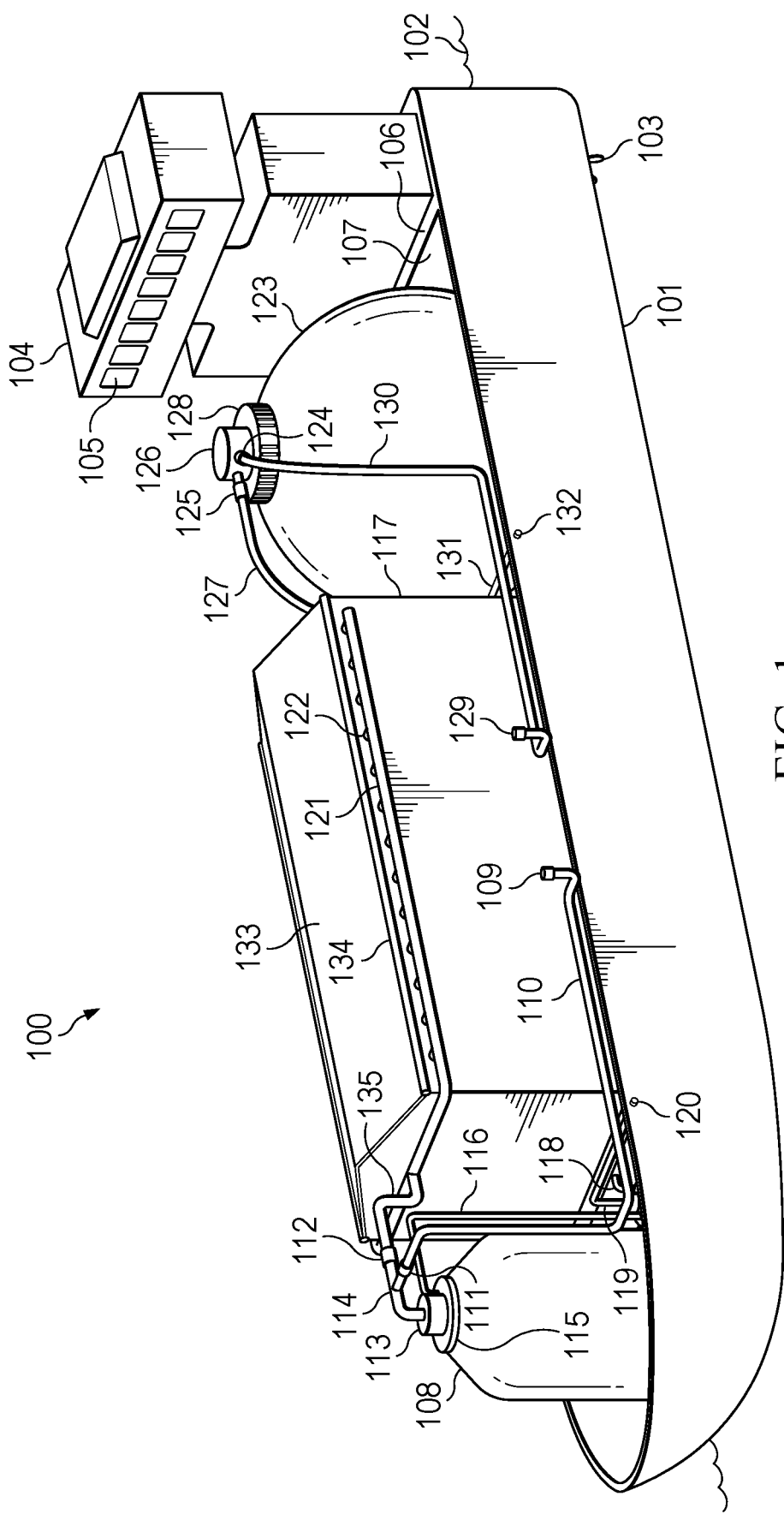
FIG. 1 is a perspective side view of a first embodiment of the present disclosure.

FIG. 1 is a perspective side view of a first embodiment 100 of the present disclosure.

The embodiment illustrated in FIG. 1 is comprised in part of a hull 101 that provides the hull, and the respective vessel, with buoyancy so that the vessel tends to float adjacent to an upper surface 102 of a body of water. The shape, size, nominal draft, nominal freeboard, nominal waterline, nominal displacement, geometry, as well as other attributes and characteristics of the embodiment's hull are arbitrary and any and all such variations are included within the scope of the present disclosure.

An engine (not visible) and a rotatably connected propeller 103 provide the vessel with the ability to propel itself. The methods, means, mechanisms, systems, technologies, and types of propulsion utilized by, and/or incorporated within, an embodiment of the present disclosure are arbitrary and any and all such variations are included within the scope of the present disclosure.

A rudder (not visible) allows the vessel to be steered in a desired direction. The methods, means, mechanisms, systems, technologies, and types of steering utilized by, and/or incorporated within, an embodiment of the present disclosure are arbitrary and any and all such variations are included within the scope of the present disclosure.

A command and control cabin 104, equipped with windows, e.g. 105, permits the navigation and operation of the vessel by one or more human operators (not visible). The methods, means, mechanisms, systems, technologies, and types of navigational and/or operational control utilized by, and/or incorporated within, an embodiment of the present disclosure, including, but not limited to, methods, means, mechanisms, systems, technologies, and types of autonomous navigational and/or operational control, are arbitrary and any and all such variations are included within the scope of the present disclosure.

The vessel 100 illustrated in FIG. 1 includes an upper deck 106, into which a sunken or recessed operational deck and/or enclosure 107 is embedded, and/or incorporated. The methods, means, structures, geometries, platforms, and types of housing in and/or within which the chemical storage and processing components of an embodiment of the present disclosure may be situated, affixed, and/or operated, are arbitrary and any and all such variations are included within the scope of the present disclosure.

The embodiment 100 illustrated in FIG. 1 contains, incorporates, utilizes, and/or includes a hydrochloric acid solution (HCl) tank, enclosure, vessel, and/or chamber 108 in which an aqueous solution of hydrochloric acid, typically of an approximately 36% weight-by-weight concentration, may be stored. HCl may be received from another vessel, mechanism, or object (not shown), via, through, and/or by means of, an HCl receiving valve 109 which is fluidly connected to an HCl intake pipe 110. When receiving a supply of HCl, an HCl tank inflow valve 111 is opened (e.g. autonomously or by a human operator) and an antagonistic HCl tank outflow valve 112 is closed, after which an HCl pump 113 draws HCl solution from an HCl tank pipe 114, which, because of the opened HCl tank inflow valve and the closed HCl tank outflow valve causes HCl solution to be drawn in, and/or pumped, from the HCl intake pipe and therethrough from the HCl receiving valve (and whatever external vessel is fluidly connected to the HCl receiving valve).

The shape, size, volumetric capacity, nominal capacity, geometry, design, and placement within an embodiment, as well as other attributes and characteristics of the embodiment's HCl tank 108 are arbitrary and any and all such variations are included within the scope of the present disclosure. An embodiment of the present disclosure may have one, two, three, or more HCl tanks, and, with respect to an embodiment having two or more tanks, two or more of those tanks may be fluidly connected in parallel, serially, and/or not fluidly connected, and any and all such variations are included within the scope of the present disclosure.

An embodiment of the present disclosure may utilize any type or strength of acidic compound or solution which is reactive with the particular respective carbon-carrying compound carried in and/or on the respective vessel. An embodiment of the present disclosure may utilize an aqueous solution of HCl of any strength and/or concentration, including, but not limited to, a strength of not less than 31.5% weight-by-weight and not greater than 38% weight-by-weight.

The material(s) with which an embodiment's HCl tank is fabricated includes, but is not limited to: cross-linked polyethylene (XLPE), high-density polyethylene (HDPE), low-density polyethylene (LDPE), fiberglass reinforced plastic (FRP), and/or steel or another metal configured to include a corrosion-resistant barrier of polypropylene or PVC.

The HCl tank 108 illustrated in FIG. 1 incorporates, utilizes, and/or includes a rigid HCl-tank cap 115 which seals the top of the HCl tank and provides a strong platform onto which the weight of the HCl pump 113 may be supported.

HCl-containing fumes produced by, and/or emanating from, the HCl solution within the HCl tank 108 are vented from the tank through an HCl vent pipe 116 from which those fumes are bubbled into a first of two reaction effluent tanks (neither is visible), the fumes tending to become dissolved into the water effluent within the first of two reaction effluent tanks. The first of two reaction effluent tanks receives reaction effluent, comprised primarily of water with dissolved calcium chloride ($CaCl_2$), from the vessel's $CaCO_3$ reaction chamber 117, through a first 118 of two reaction effluent pipes (the second of two reaction effluent pipes is not visible). When an upper surface of the reaction effluent within the first of two reaction effluent tanks reaches or exceeds a threshold level, a reaction effluent tank on the first of two reaction effluent tanks pumps reaction effluent from the respective tank, into a respective reaction effluent evacuation pipe 119, and through an aperture and/or mouth 120 at the end of that pipe, thereby discharging reaction effluent into the body of water 102 on which the vessel floats.

Other embodiments of the present disclosure may discharge HCl fumes produced by, or emanating from, HCl solution stored and/or contained within their HCl tanks 108 directly into the atmosphere. Some embodiments may discharge HCl fumes directly into the water 102 on which the embodiment floats. And other embodiments may discharge, manage, contain, recycle, and/or avoid the emission of, HCl fumes in other ways, and/or by other mechanisms, and any and all such variations are included within the scope of the present disclosure.

When the embodiment 100 is not uploading HCl solution from another vessel via HCl receiving valve 109, and when the HCl tank 108 contains a sufficient amount and/or volume of HCl solution, and the vessel's $CaCO_3$ reaction chamber 117 contains a sufficient amount of $CaCO_3$, then the HCl tank inflow valve 111 is closed, and the complementary and/or antagonistic HCl tank outflow valve 112 is opened, and the HCl pump 113 is actuated, energized, and/or operated, so as to pump HCl solution from an interior of the HCl tank into HCl tank pipe 114 through the open HCl tank outflow valve, and into an HCl feed pipe 135 from which the pumped HCl solution will flow into first and second 121 HCl distribution pipes. Each of the embodiment's two HCl distribution pipes are fluidly connected to a plurality of spray heads, e.g. 122, positioned within an interior of the $CaCO_3$ reaction chamber. HCl solution pumped into the HCl distribution pipes is thereby sprayed over, upon, onto, and/or into, the $CaCO_3$ stored within the $CaCO_3$ reaction chamber.

The HCl solution sprayed onto the $CaCO_3$ within the $CaCO_3$ reaction chamber 117 tends to chemically react with the $CaCO_3$ causing a release of $CO_2$, water, and $CaCl_2$. As mentioned earlier, the water and $CaCl_2$ produced by the reaction tends to drain down and through the $CaCO_3$ within the $CaCO_3$ reaction chamber, eventually collecting at a bottom of the $CaCO_3$ reaction chamber and thereafter flowing out of the reaction chamber and into one of two reaction effluent tanks (not visible) where a pump discharges the water and $CaCl_2$ into the body of water 102 on which the embodiment floats. The $CO_2$ generated, and/or produced, by the reaction of the HCl solution with the $CaCO_3$ is trapped within the $CaCO_3$ reaction chamber.

When the embodiment is not discharging compressed $CO_2$ from its $CO_2$ tank 123, and $CO_2$ tank outflow valve 124 is closed, then when the $CO_2$ generation reaction is activated, in progress, and/or being executed, $CO_2$ is pulled from the $CaCO_3$ reaction chamber 117 and stored within the embodiment's $CO_2$ tank 123. To collect $CO_2$ from within the $CaCO_3$ reaction chamber, the embodiment (e.g. autonomously or by a human operator) opens $CO_2$ tank inflow valve 125 (if not already open), and activates, actuates, and/or energizes $CO_2$ pump 126 in such a way, or following a configuration of the pump, such that the $CO_2$ pump draws CO2 from CO2 offtake pipe 127 which is fluidly connected to an interior of the CaCO3 reaction chamber where CO2 gas produced through the acidification of the CaCO3 therein tends to accumulate. The CO2 pump compresses the CO2 gas it retrieves from the interior of the CaCO3 reaction chamber and causes that gas to be trapped and stored within the embodiment's CO2 tank. A refrigeration apparatus 128 atop the CO2 tank tends to cool the compressed gas within.

When another vessel, mechanism, or object (not shown), fluidly connects an intake hose (not shown) to CO2 offloading valve 129, and the embodiment (e.g. autonomously or by a human operator) configures the embodiment to dispense, transfer, and/or offload, compressed CO2 to the other vessel, then the pumping of HCl solution into the CaCO3 reaction chamber 117 is stopped in order to prevent a buildup and/or over pressurization of CO2 therein, CO2 tank inflow valve 125 is closed, CO2 tank outflow valve 124 is opened, and CO2 pump 126 is activated, actuated, and/or energized, in such a way, or following a configuration of the pump, such that the CO2 pump draws compressed CO2 from an interior of the CO2 tank 123 and pumps it into CO2 offloading pipe 130, and therethrough to the other vessel where it is nominally stored within a complementary compressed CO2 tank contained, incorporated, and/or included within and/or on the other vessel.

When a level and/or volume of effluent within a second (not visible) of two reaction effluent tanks reaches a threshold value, a pump on and/or within that reaction effluent tank discharges water and CaCl2 from an interior of that tank, into and through a respective reaction effluent evacuation pipe 131, out from a mouth 132 of that reaction effluent evacuation pipe, and into the body of water 102 on which the embodiment floats.

After the CaCO3 stored within the CaCO3 reaction chamber 117 has been exhausted, the embodiment will typically return to a port or other location from which its store and/or supply of CaCO3 may be restored. At that time, in order to facilitate a loading of CaCO3 into the embodiment's CaCO3 reaction chamber, an upper and opposite pair of pitched panels, e.g. reaction chamber upper panel 133, are rotated about respective panel hinges, e.g. 134, thereby opening an upper aperture of the CaCO3 reaction chamber into and/or through which CaCO3 may be deposited into an interior of the CaCO3 reaction chamber.

Figure 2:
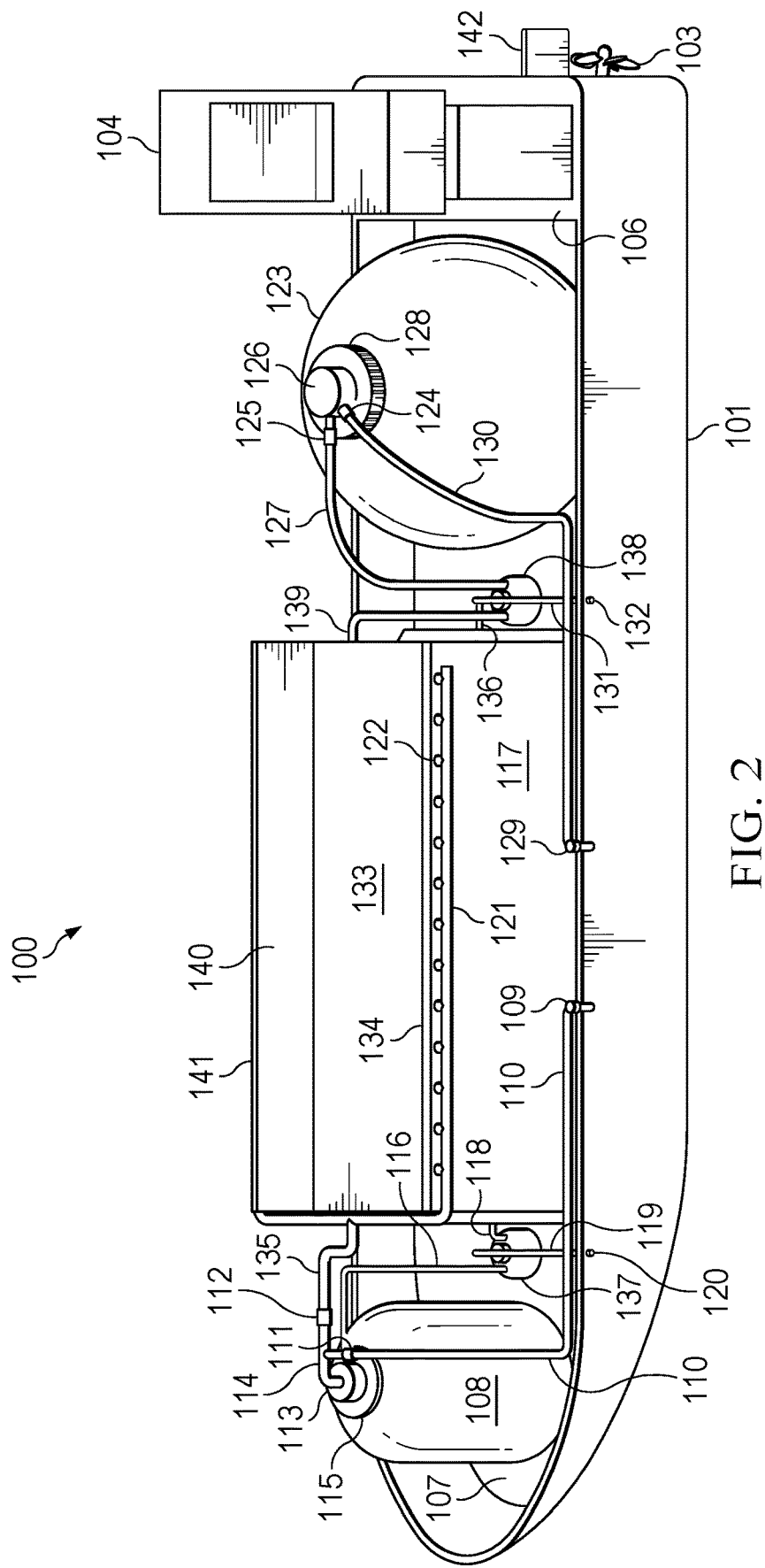
FIG. 2 is a perspective side view of the first embodiment of the present disclosure.

FIG. 2 is a perspective side view of the same embodiment 100 of the present disclosure illustrated in FIG. 1.

HCl solution from HCl tank 108 is pumped out of the HCl tank by HCl pump 113 and caused to flow into and through HCl tank pipe 114, HCl tank outflow valve 112, and HCl feed pipe 135. The pumped flow of HCl solution is split, bifurcated, and/or divided, such that it then flows into one and/or either of two HCl distribution pipes, e.g. 121, and from there is ejected into an interior of the CaCO3 reaction chamber 117 from and/or by one of a respective plurality of spray heads, e.g. 122. The ejected HCl solution tends to chemically react with any CaCO3 it contacts inside the CaCO3 reaction chamber thereby causing each two moles of HCl, and each mole of CaCO3, that reacts to produce one mole of CO2, one mole of H2O, and one mole of CaCl2. In addition to this, a substantial portion of the HCl solution is comprised of water which tends to add to the volume, mass, quantity, and/or amount of water that is left within the CaCO3 reaction chamber after, and/or as a result of, the reaction(s) of the HCl solution and the CaCO3.

The CaCl2 created within the CaCO3 reaction chamber 117 tends to dissolve in the water remaining within the reaction chamber after the reaction has occurred, and/or while it is occurring. And, that aqueous solution of CaCl2 tends to filter down and through the unreacted CaCO3 to collect at a bottom portion of an interior of the CaCO3 reaction chamber. That aqueous CaCl2 solution tends to then flow out of the CaCO3 reaction chamber through first 118 and second 136 reaction effluent pipes, and therefrom flow into respective first 137 and second 138 reaction effluent tanks.

Fumes emitted by the HCl solution stored within the embodiment's HCl tank 108 are vented into and through a HCl vent pipe 116 from where it flows into a lower position within an interior of the first 137 reaction effluent tank where the HCl fumes tend to bubble upward within, and/or through, and dissolve into, the aqueous solution of CaCl2 contained therein. Periodically a pump atop the first reaction effluent tank pumps a portion of the aqueous CaCl2 solution within the first reaction effluent tank into and through reaction effluent evacuation pipe 119, and therefrom through a mouth of that reaction effluent evacuation pipe, thereby being deposited into the body of water on which the embodiment floats.

CO2 gas generated by the chemical reactions of HCl and CaCO3 within the CaCO3 reaction chamber 117 are vented from an interior of that CaCO3 reaction chamber through a CO2 vent pipe 139 from where it flows into a lower position within an interior of the second 138 reaction effluent tank where the CO2 tends to bubble upward within and/or through the aqueous solution of CaCl2 contained therein. Any residual HCl fumes will tend to dissolve into aqueous solution of CaCl2 contained within the reaction effluent tank, after which the "de-acidified" CO2 gas is drawn, pulled, and/or flows, into CO2 offtake pipe 127 as a result of a partial vacuum therein created by CO2 pump 126, and the open configuration of CO2 tank inflow valve 125.

Periodically a pump atop the second reaction effluent tank 138 pumps a portion of the aqueous CaCl2 solution within the second reaction effluent tank into and through reaction effluent evacuation pipe 131, and therefrom through a mouth of that reaction effluent evacuation pipe, thereby being deposited into the body of water on which the embodiment floats.

When the roof, and/or upper wall, of the CaCO3 reaction chamber 117 is opened in order to receive, and/or to be resupplied with, CaCO3 (e.g. to replace a prior quantity of CaCO3 consumed during a prior production of CO2), the two complementary reaction chamber upper panels 133 and 140 rotate about their respective hinges 134 and 141 so as to rotate each panel from its nominal approximately horizontal orientation to an approximately vertical orientation, thereby allowing CaCO3 rich materials, e.g. lime sand, to be dropped, and/or to be deposited, into an interior of the CaCO3 reaction chamber. When the CaCO3 reaction chamber has received a sufficient supply of CaCO3, the reaction chamber upper panels again rotate about their respective hinges so as to rotate each panel from its "loading" and/or open approximately vertical orientation to a "sealed" and/or approximately horizontal orientation. The CaCO3 reaction chamber is configured to be approximately "air tight" and/or approximately hermetically sealed when its reaction chamber upper panels are in their "closed" horizontal operational orientations.

The embodiment illustrated in FIG. 2 contains, incorporates, utilizes, and/or includes a rudder 142 which enables, and/or facilitates, the steering and navigation of the vessel, especially when the embodiment's propeller is energized and rotating.

Figure 3:
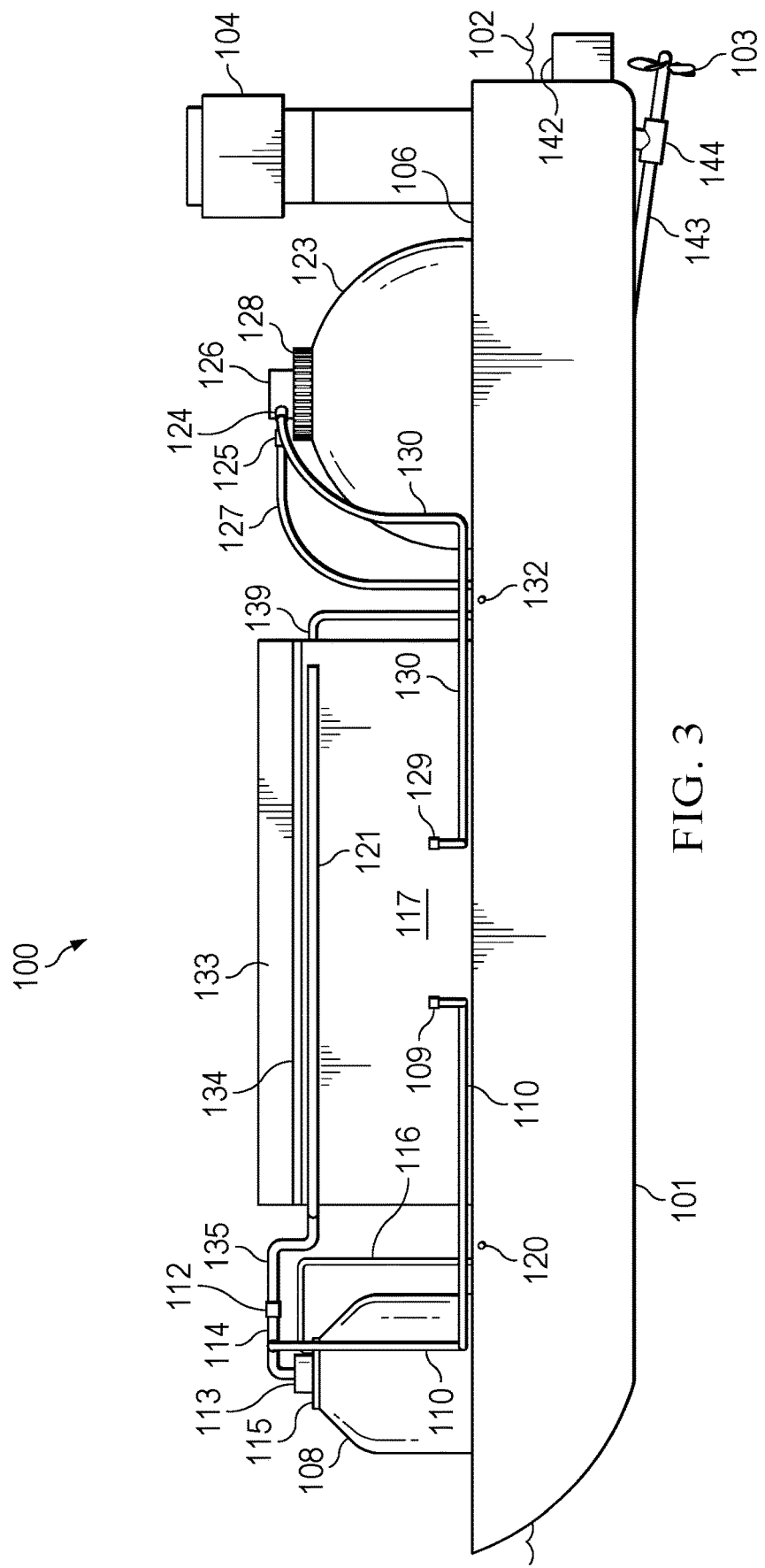
FIG. 3 is a side view of the first embodiment of the present disclosure.

FIG. 3 is a side view of the same embodiment 100 of the present disclosure illustrated in FIGS. 1 and 2.

The embodiment's propeller 103 is rotatably connected to a propeller shaft 143 the rotations of which are stabilized by a propeller shaft sleeve bearing 144.

Figure 4:
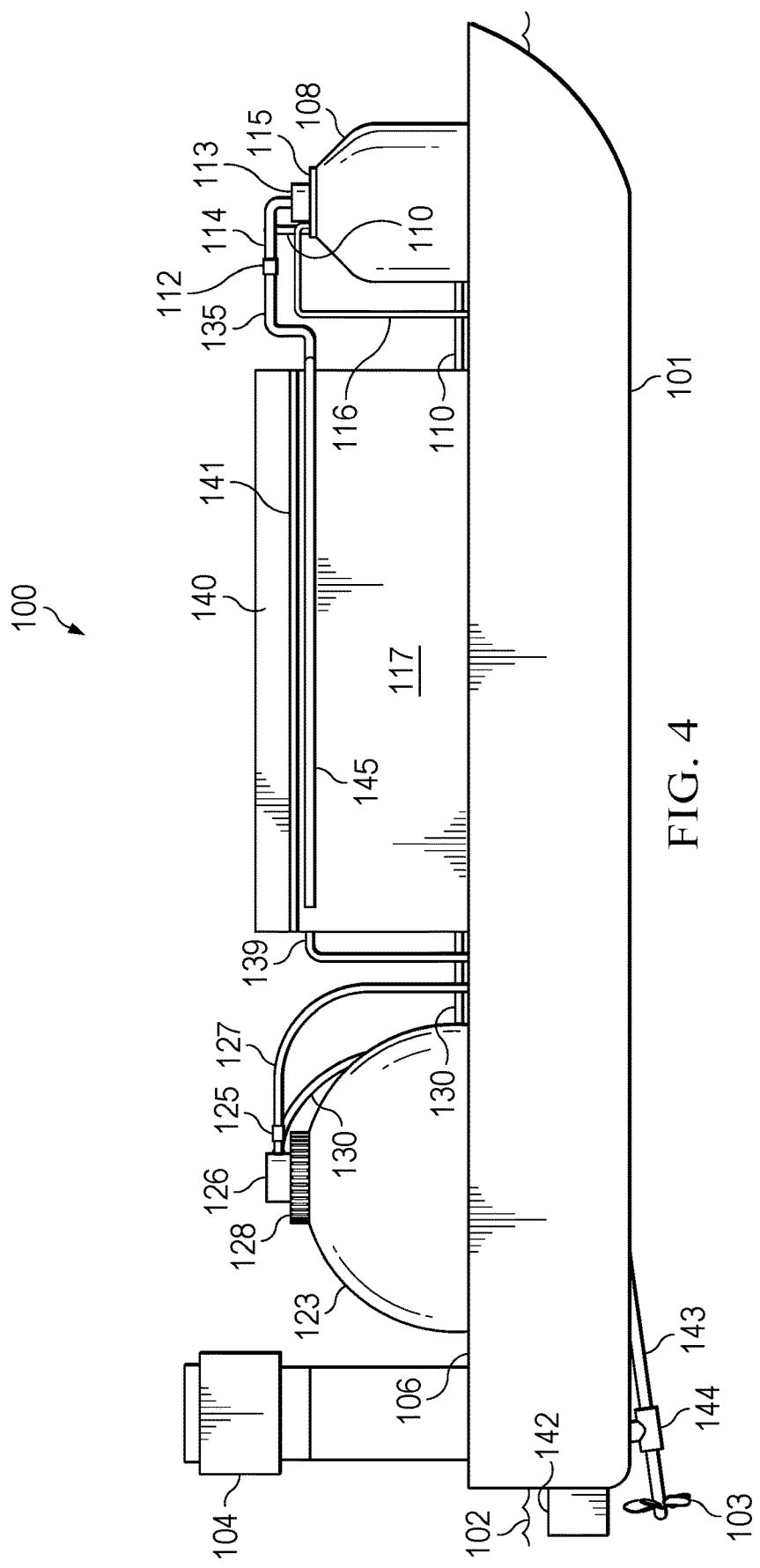
FIG. 4 is a side view of the first embodiment of the present disclosure.

FIG. 4 is a side view of the same embodiment 100 of the present disclosure illustrated in FIGS. 1-3.

HCl solution from HCl tank 108 is pumped out of the HCl tank by HCl pump 113 and caused to flow into and through HCl tank pipe 114, HCl tank outflow valve 112, and HCl feed pipe 135. The pumped flow of HCl solution is split, bifurcated, and/or divided, such that it then flows into one and/or either of two HCl distribution pipes 145 and 121 (in FIGS. 1-3), and from there is ejected into an interior of the CaCO3 reaction chamber 117 from and/or by one of a respective plurality of spray heads (not visible).

Figure 5:
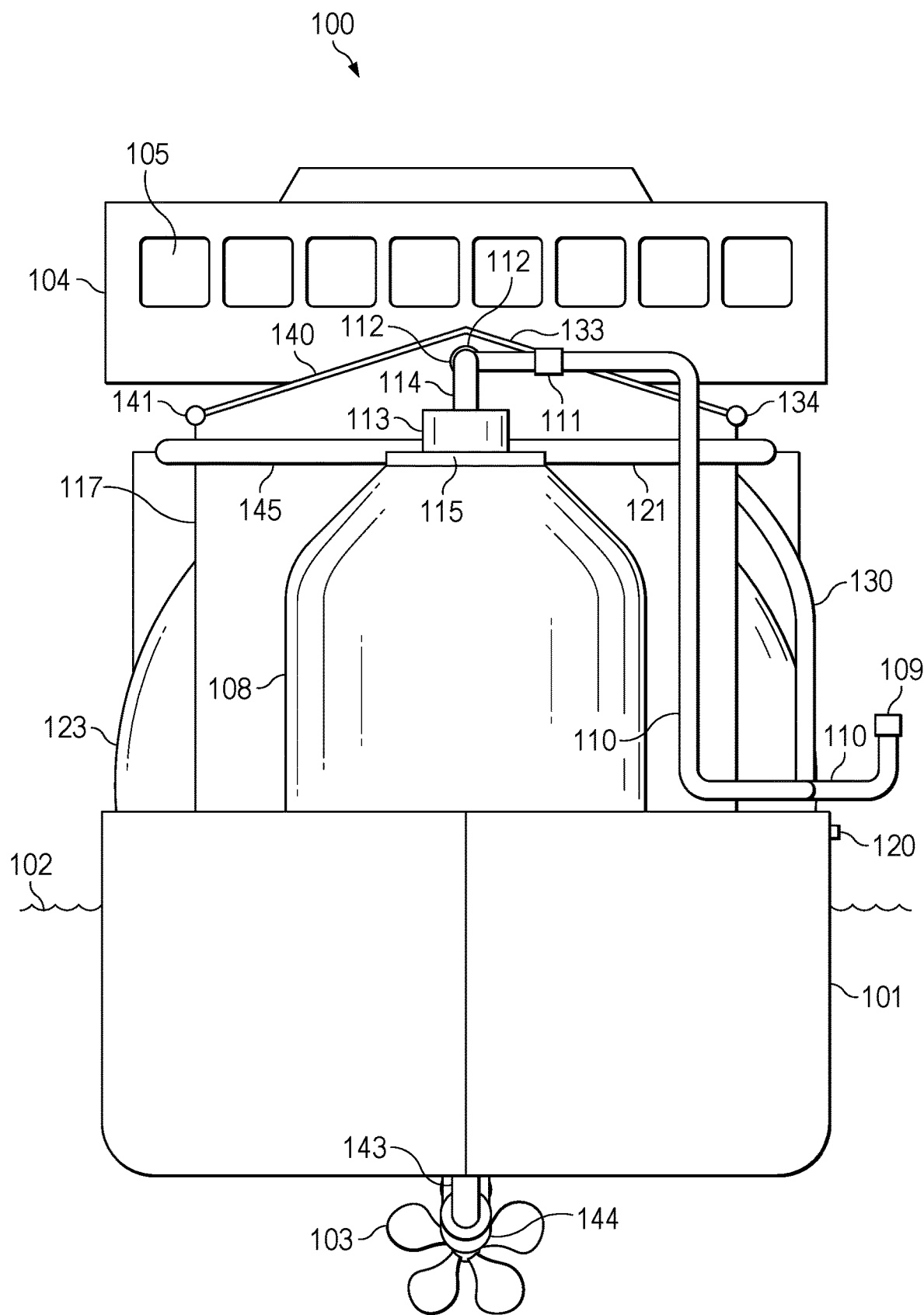
FIG. 5 is a front side view of the first embodiment of the present disclosure.

FIG. 5 is a side view of the same embodiment 100 of the present disclosure illustrated in FIGS. 1-4.

Figure 6:
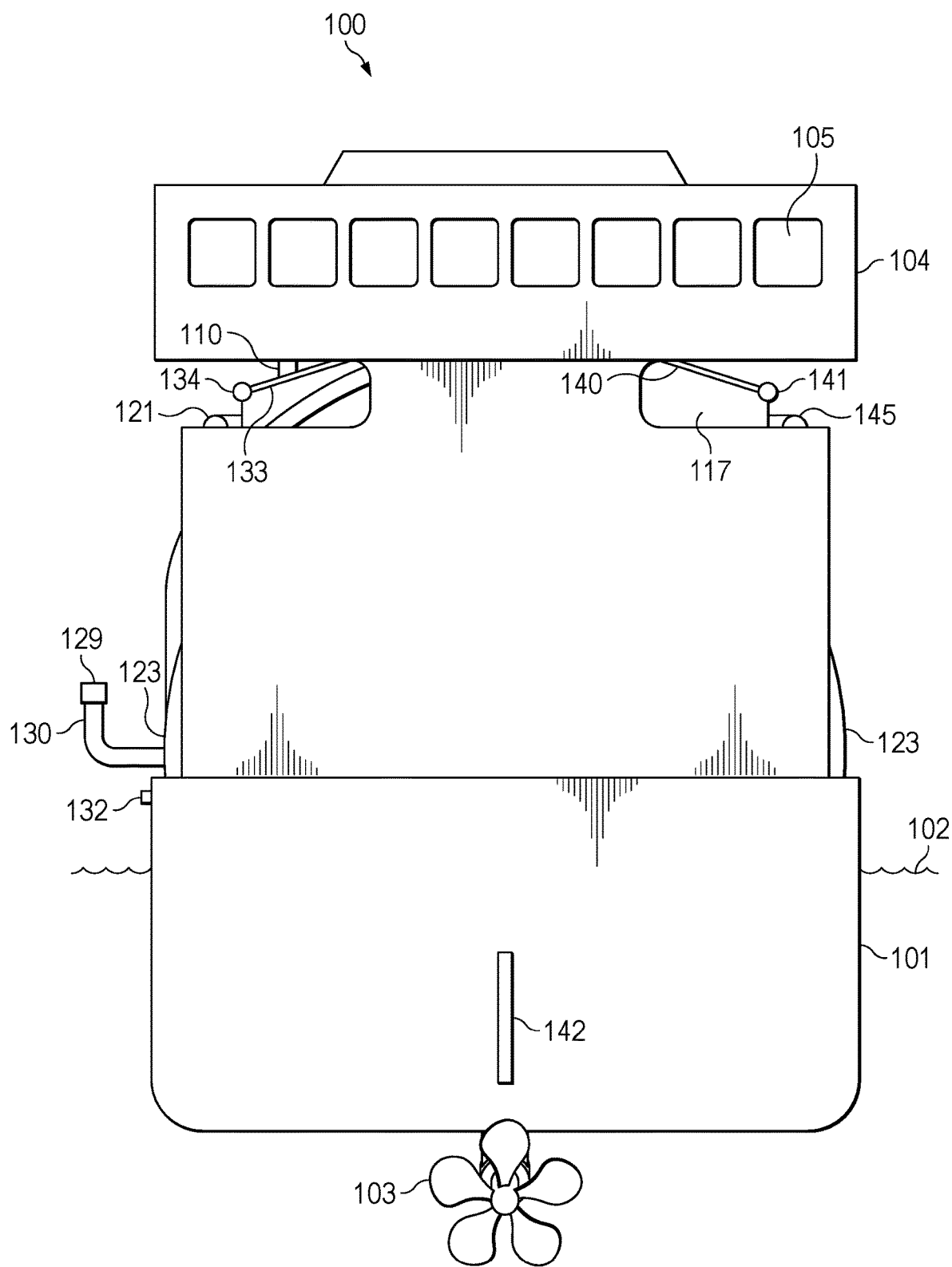
FIG. 6 is a back side view of the first embodiment of the present disclosure.

FIG. 6 is a side view of the same embodiment 100 of the present disclosure illustrated in FIGS. 1-5.

Figure 7:
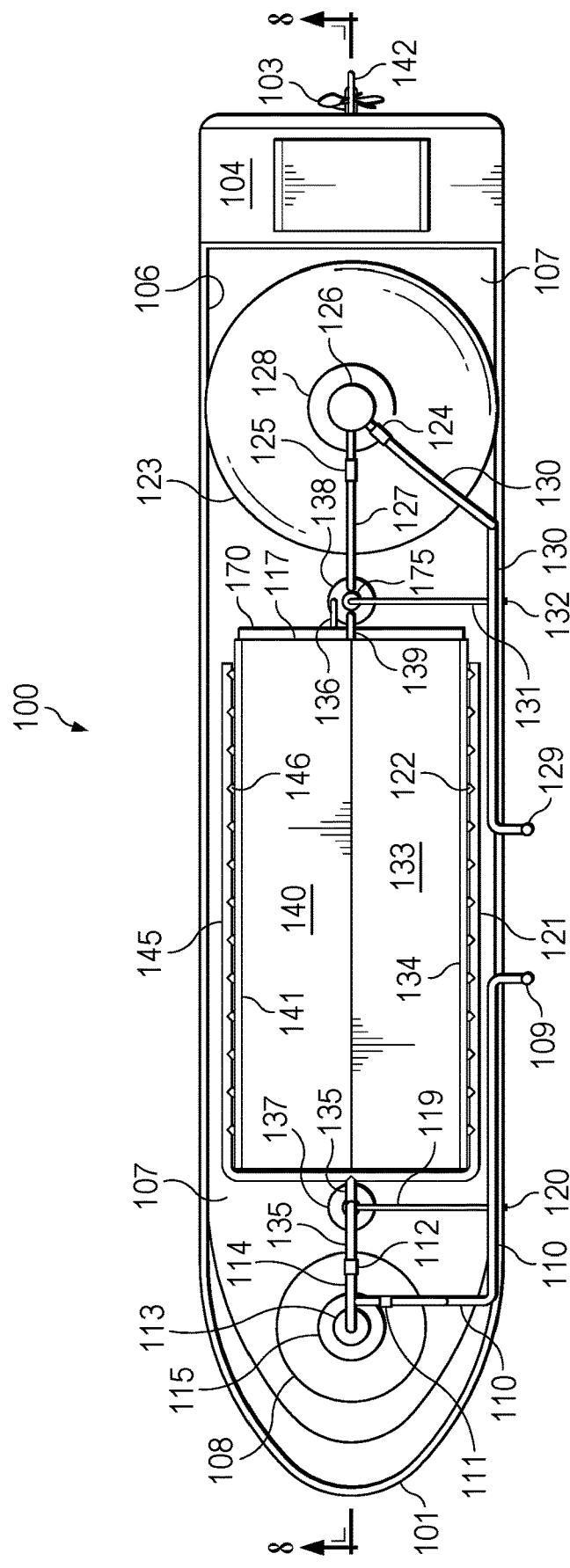
FIG. 7 is a top-down view of the first embodiment of the present disclosure.

FIG. 7 is a top-down view of the same embodiment 100 of the present disclosure illustrated in FIGS. 1-6.

HCl solution from HCl tank 108 is pumped out of the HCl tank by HCl pump 113 and caused to flow into and through HCl tank pipe 114, HCl tank outflow valve 112, and HCl feed pipe 135. The pumped flow of HCl solution is split, bifurcated, and/or divided, such that it then flows into one and/or either of two HCl distribution pipes. HCl solution pumped into and through HCl distribution pipe 121 thereafter flows into and through one of a respective plurality of spray heads, e.g. 122, thereby being injected, distributed, and/or sprayed, onto, into, and/or within, an interior of the CaCO3 reaction chamber 117 and CaCO3 stored, positioned, and/or held there. Similarly, HCl solution pumped into and through HCl distribution pipe 145 thereafter flows into and through one of a respective plurality of spray heads, e.g. 146, thereby being injected, distributed, and/or sprayed, onto, into, and/or within, an interior of the CaCO3 reaction chamber 117 and CaCO3 stored, positioned, and/or held there.

Liquid effluent created within an interior of the CaCO3 reaction chamber 117 tends to collect in fore and aft 170 effluent channels, after which it tends to drain into respective fore 137 and aft 138 reaction effluent tanks. When the level of liquid effluent within either reaction effluent tank reaches or exceeds a threshold level or volume, the excess CaCO3 effluent stored within each respective reaction effluent tank is pumped out of that reaction effluent tank and into the body of water on which the embodiment floats by a respective reaction effluent tank pump, e.g. 175.

Figure 8:
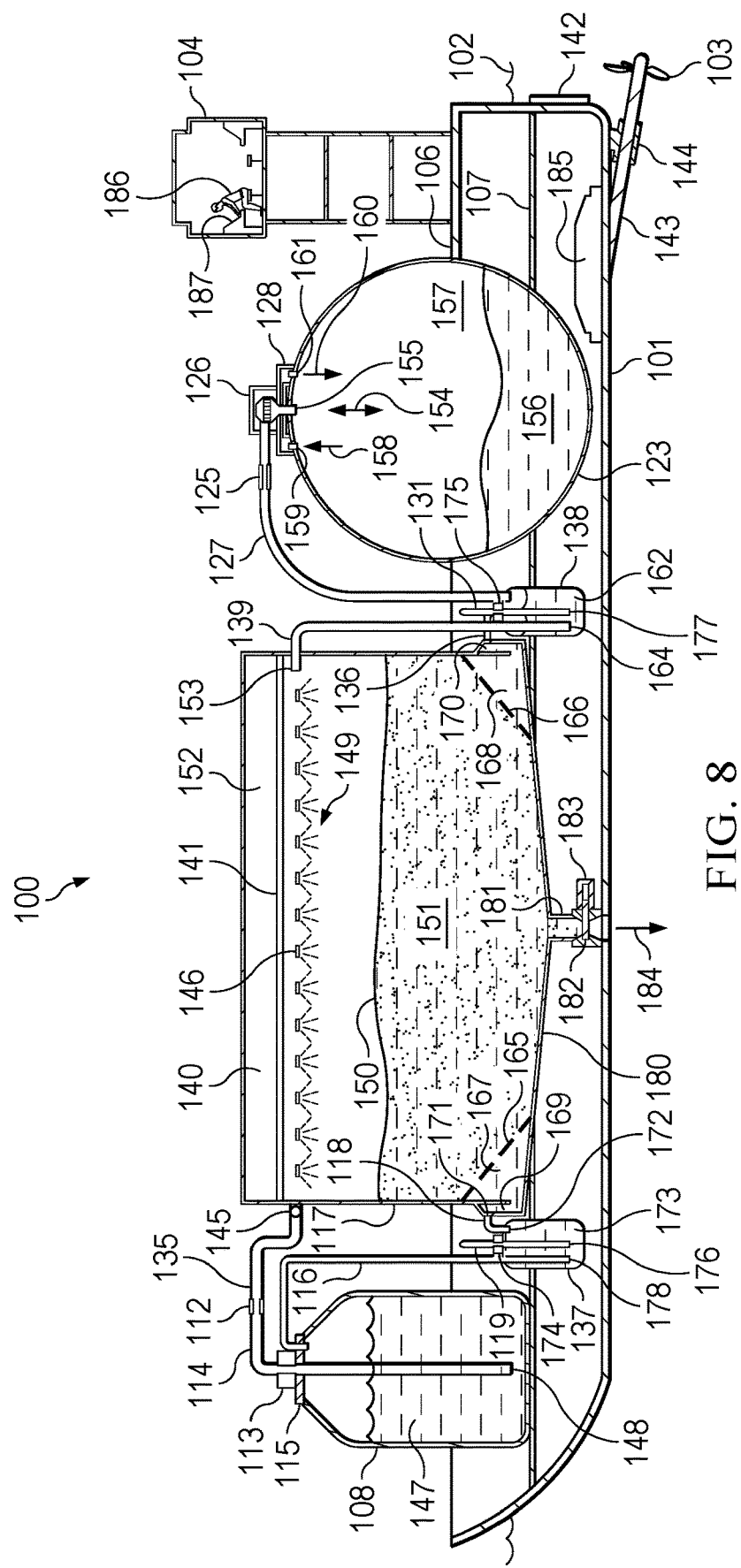
FIG. 8 is a side sectional view of the first embodiment of the present disclosure.

FIG. 8 is a side sectional view of the same embodiment 100 of the present disclosure illustrated in FIGS. 1-7 wherein the vertical section plane is specified in FIG. 7 and the section is taken across line 8-8.

When the embodiment is configured to produce and store CO2, the HCl pump 113 is actuated, energized, and/or operated, thereby causing HCl solution 147 from an interior of the HCl tank 108 to be drawn into and through a mouth and/or aperture 148 an end of HCl tank pipe 114 thereby causing that fluid to flow into and through that HCl tank pipe, and therefrom into and through HCl tank outflow valve 112 which is an open configuration and therefore permits the pumped HCl solution to flow into and through HCl feed pipe 135 where the flowing stream of HCl solution splits, bifurcates, and/or divides, such that a portion of that flowing stream flows into and through HCl distribution pipe 141 and thereafter flows into and through one of a respective plurality of spray heads, e.g. 146, thereby flowing out of, and/or being injected, distributed, and/or sprayed 149, onto, into, and/or within, an interior of the CaCO3 reaction chamber 117—the sprayed HCl solution tending to fall upon an upper surface 150 of the CaCO3 151 stored, positioned, and/or held within the CaCO3 reaction chamber.

HCl solution falling upon 149, mixing with, flowing onto and/or through, and/or contacting, the CaCO3 151 within the CaCO3 reaction chamber 117 tends to result in a reaction of HCl within the HCl solution and CaCO3, which tends to result in the production, synthesis, and/or generation, of reaction products, including, but not limited to, gaseous CO2, liquid water, and CaCl2 (which tends to dissolve, and/or to remain dissolved, within the water present within the CaCO3 reaction chamber). The water reaction product adds to the water remaining within the HCl solution after the reaction and/or removal of the HCl.

The junctions, abutments, and points of contact, between the closed reaction chamber upper panels, e.g. 140, are nominally sealed and/or configured to obstruct an escape of gas from an interior of the CaCO3 reaction chamber to the atmosphere outside the embodiment. CO2 produced by the HCl—CaCO3 reaction tends to fill, accumulate, and/or concentrate, within a gas pocket 152 above the CaCO3 151 nominally trapped within the CaCO3 reaction chamber 117. The gas pocket is in fluid communication with an interior of the CO2 vent pipe 139 through, and/or via, an upper mouth 153 of the CO2 vent pipe.

When the embodiment is configured to produce and store CO2, the CO2 pump 126 is actuated, energized, and/or operated, thereby causing CO2 to be pulled and/or drawn from CO2 offtake pipe 127, into and through CO2 tank inflow valve 125, into and through an interior of the CO2 pump and therefrom to flow 154 through and out of a mouth 155 and/or aperture of the CO2 pump. The CO2 drawn and/or pumped into CO2 tank 123 will tend to liquify at a temperature and pressure, which will then tend to produce a reservoir 156 of liquified CO2 at a bottom position within an interior of the CO2 tank, and a pocket 157 of compressed gaseous CO2 above that reservoir of liquified CO2.

When activated by a sensor (not shown) registering a temperature within an interior of the CO2 tank 123 that is at or below an upper threshold temperature, the embodiment activates, actuates, and/or energizes, a CO2 refrigeration apparatus 128, module, mechanism, and/or device, in fluid communication with an interior of the CO2 tank 123. The CO2 refrigeration apparatus draws in 158 gaseous CO2 from the pocket 157 of compressed gaseous CO2 within the CO2 tank through a CO2 inflow pipe 159, chills that ingested CO2 gas, and then pumps out, and/or expels 160, the chilled CO2 gas through a CO2 outflow pipe 161.

By drawing gaseous CO2 from an interior of CO2 offtake pipe 127, CO2 present in an upper gas pocket within the reaction effluent tank 138 is drawn into and through mouth and/or aperture 162. When the partial pressure of the CO2 within the upper gas pocket within the reaction effluent tank is reduced to a sufficient degree (e.g. to overcome the head pressure of the CaCl2 effluent solution 162 inhibiting a flow of CO2 gas out of a lower mouth 163 and/or aperture of the CO2 vent pipe 139), then CO2 gas within the gas pocket 152 within an upper portion of the CaCO3 reaction chamber 117 will tend to flow through upper CO2 vent pipe mouth 153 and/or aperture and into and through CO2 vent pipe and therefrom flow out of lower CO2 vent pipe mouth 164 and/or aperture and bubble up through the CaCl2 effluent solution 162 within the reaction effluent tank. As it bubbles upward through the CaCl2 effluent solution any HCl fumes within the CO2 gas will tend to become dissolved within the CaCl2 effluent solution and not flow into and through CO2 offtake pipe 127 and therethrough into the CO2 tank 123.

The CaCl2 effluent solution 162 within the reaction effluent tanks 137 and 138 originates within the CaCO3 reaction chamber 117 and is a combination of: water and CaCl2 produced by the reaction of HCl with CaCO3; and water from the HCl solution introduced into the CaCO3 reaction chamber. The CaCl2 effluent tends to accumulate at a bottom portion of an interior of the CaCO3 reaction chamber. The CaCl2 effluent tends to flow through fore 165 and aft 166 screens and/or gratings, and to pool, and/or become accessible within, respective fore 167 and aft 168 effluent pools. The effluent pools extend into respective fore 169 and aft 170 effluent channels, and, each effluent channel is fluidly connected to respective fore 118 and aft 136 reaction effluent pipes, each effluent pipe having an inflow mouth and/or aperture, e.g. 171, into and through which CaCl2 effluent solution flows into each respective reaction effluent pipe, and an outflow mouth and/or aperture, e.g. 172, from which CaCl2 flows out of each respective reaction effluent pipe and into each respective reaction effluent tank, thereby increasing the volume, mass, and/or level of CaCl2 effluent solution 173 and 162 within the respective fore 137 and aft 138 reaction effluent tanks.

When the volume, mass, and/or level of CaCl2 effluent solution 173 and 162 within the respective fore 137 and aft 138 reaction effluent tanks reaches or exceeds respective threshold volumes, masses, and/or levels, then respective reaction effluent tank pumps 174 and 175 pump CaCl2 effluent solution from each respective reaction effluent tank into and through respective lower reaction effluent evacuation pipe mouths and/or apertures 176 and 177, and therefrom into and through respective reaction effluent evacuation pipes 119 and 131, and therefrom out of the embodiment 100 and into the body of water 102 on which the embodiment floats.

Each pumped evacuation of CaCl2 effluent solution 173 from reaction effluent tank 137 tends to contain, and carry from the embodiment, any HCl dissolved therein as a result of an introduction of HCl fumes to the CaCl2 effluent solution from and/or through HCl vent pipe 116 and the lower mouth 178 of that HCl vent pipe whereafter the HCl fumes tend to bubble up and through the CaCl2 effluent solution within the reaction effluent tank, and whereby most, if not all, of the HCl fumes tend to become dissolved and/or absorbed into the CaCl2 effluent solution.

Each pumped evacuation of CaCl2 effluent solution 162 from reaction effluent tank 138 tends to contain, and carry from the embodiment, any HCl dissolved therein as a result of an introduction of CO2 gas contaminated with HCl fumes to the CaCl2 effluent solution from and/or through CO2 vent pipe 139 and the lower mouth 179 of that CO2 vent pipe whereafter the CO2 tends to bubble up and through the CaCl2 effluent solution within the reaction effluent tank, and whereby most, if not all, HCl fumes contaminating the CO2 gas tend to become dissolved and/or absorbed into the CaCl2 effluent solution.

The lower wall 180, surface, and/or floor, of the CaCO3 reaction chamber 117 is sloped downward from the fore and aft ends of the reaction chamber toward the center such that residue remaining within the CaCO3 reaction chamber (e.g. silica and stones) will tend to move toward the center of the floor of the CaCO3 reaction chamber and flow into a cylindrical drain tube 181, recess, and/or aperture when an interior of the CaCO3 reaction chamber is flushed with HCl solution, and/or with seawater (e.g. from a pump and pipes not shown), and/or with water (e.g. from a tank, pump, and pipes not shown). Nominally closed when the embodiment is configured to generate and store CO2, when CO2 production ends and the drain obstruction 182 (e.g. the gate) of a drain valve 183 (e.g. a gate valve) is opened, then any residue, and/or remaining CaCO3, will tend to be flushed 184 out of the cylindrical drain tube and therefrom into the body of water 102 on which the embodiment floats.

A propulsion engine and/or motor 185 provides rotational power to the propeller shaft 143 which then turns within propeller shaft sleeve bearing 144 and rotates the propeller 103 thereby tending to move the embodiment forward or backward (depending upon the direction in which the propulsion engine rotates the propeller shaft—as dictated by the embodiment's operator 186 via a control panel 187, and/or by an autonomous embodiment control system located, at least in part, within the embodiment control apparatus and/or system 187).

Figure 9:
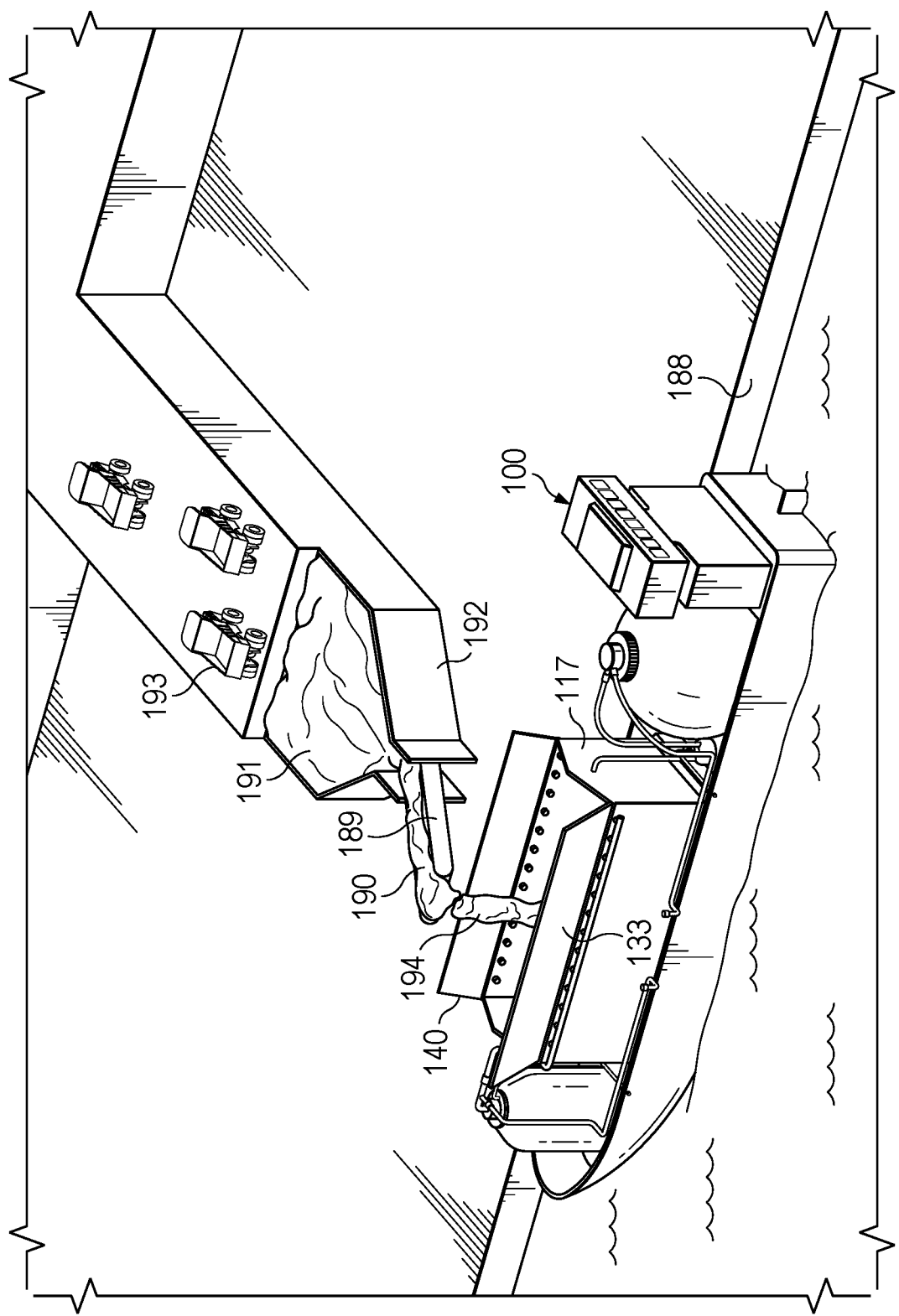
FIG. 9 is a perspective view a shoreside loading of the first embodiment of the present disclosure.

FIG. 9 is a perspective view of the same embodiment 100 of the present disclosure illustrated in FIGS. 1-8. The embodiment illustrated in FIG. 9 is configured for receiving a supply of CaCO3. As the embodiment is moored alongside a pier, wharf, or dock 188, its operator and/or autonomous control system (not shown) has raised, and/or opened the reaction chamber upper panels 133 and 140 so as to expose and provide access to an interior of the embodiment's CaCO3 reaction chamber 117. A CaCO3 conveyor belt 189 is conveying, lifting, raising, elevating, transporting, and/or moving an approximately linear train 190, portion, distribution, and/or trail, of CaCO3 which, after reaching the upper and/or distal end of the conveyor belt, falls 194 into an interior of the CaCO3 reaction chamber.

The conveyor belt is fed, receives, and/or is loaded, with CaCO3 that is drawn from a mound, pile, and/or heap 191 of CaCO3 that is stabilized, stored, and/or contained, within a bin, pen, and/or enclosure 192 after having been dumped, placed, loaded, and/or poured into that bin by a series, plurality, and/or parade of dump trucks 193, dirt haulers, and/or bulk carrier vehicles. The dump trucks will have typically received their load of CaCO3 from and/or at a site where CaCO3 (e.g. in the form of chalk and/or limestone) is being mined.

Figure 10:
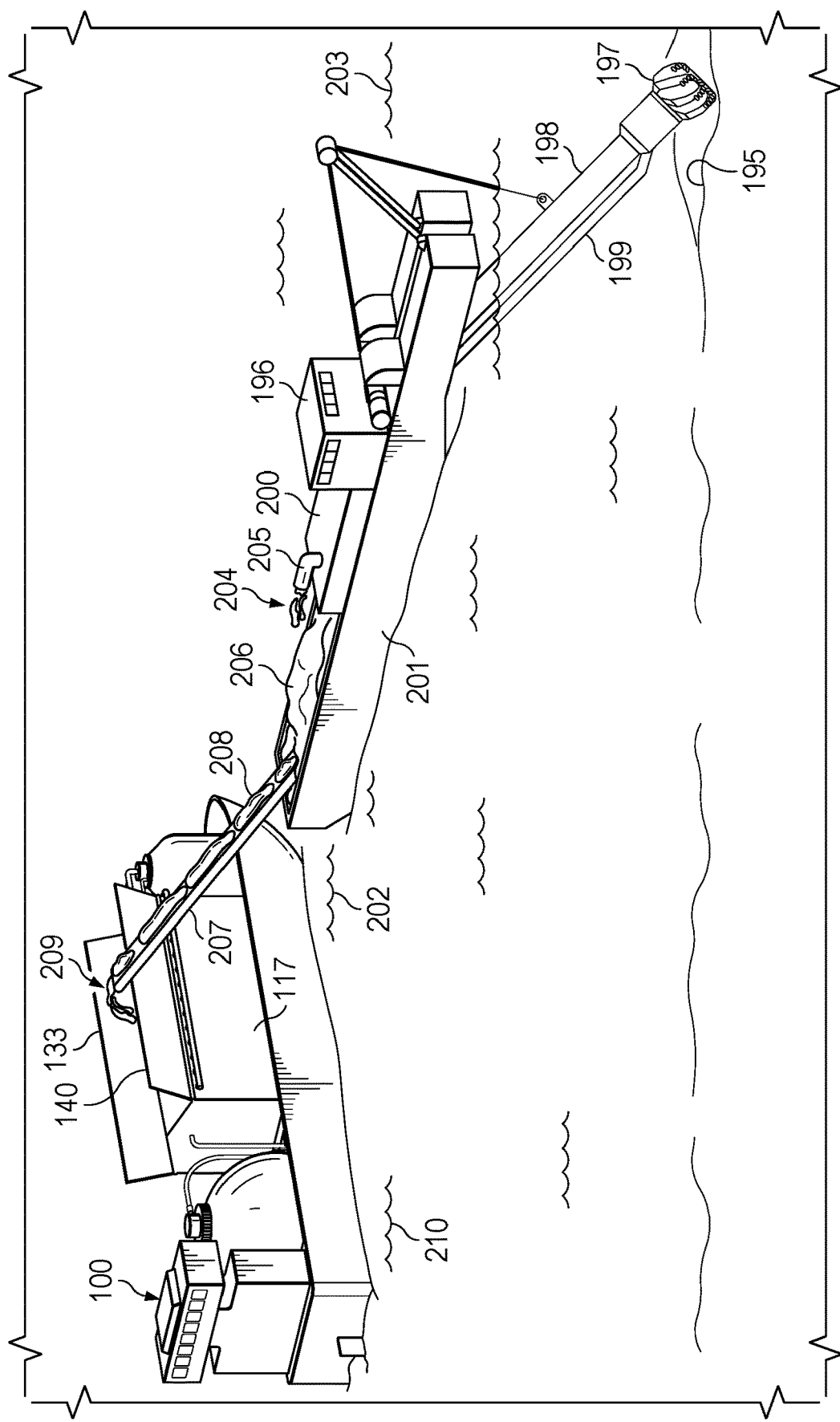
FIG. 10 is a perspective view an offshore loading of the first embodiment of the present disclosure.

FIG. 10 is a perspective view of the same embodiment 100 of the present disclosure illustrated in FIGS. 1-9. Similarly to the embodiment illustrated in FIG. 9, the embodiment illustrated in FIG. 10 is configured for receiving a supply of CaCO3. However, whereas the embodiment in FIG. 9 is illustrated receiving a supply of CaCO3 from a terrestrial source, the embodiment illustrated in FIG. 10 is illustrated receiving a supply of CaCO3 from a marine source, i.e. from a seafloor 195.

As a consequence of a buoyant hull 201, a dredging vessel 196 floats adjacent to an upper surface 202 of a body of water 203. The dredging vessel incorporates and/or utilizes a drilling, grinding, and/or an excavating head 197, which is positioned, secured, held, and energized by a motor and shaft incorporated, included, and/or contained, within a tubular drilling fixture 198, tends to loosen, dislodge, pulverize, and/or emulsify a CaCO3-rich portion of seafloor 195, e.g. one rich or composed entirely of lime sands. The loosened CaCO3-rich seafloor material, e.g. the lime sand, is sucked, and/or drawn up, to the dredging vessel through a suction tube 199 as a result of suction, and/or pumping action, manifested by a suction pump 200. The solid CaCO3-rich seafloor material sucked from the seafloor is ejected 204 from an ejection tube 205 onto, into, and/or on top of, an accumulated mound 206 of priorly ejected CaCO3-rich seafloor material, and from there is fed onto a conveyor belt 207 where smaller mounds, e.g. 208, are lifted, and/or ascend, the conveyor belt until they fall 209 from an end of the conveyor belt. The CaCO3 that falls from the end of the conveyor belt, falls past opened reaction chamber upper panels 133 and 140 of an embodiment 100 of the present disclosure, and into an interior of the embodiment's CaCO3 reaction chamber 117.

The embodiment 100 floats adjacent to an upper surface 210 of the same body of water 203 adjacent to a surface 202 of which the dredging vessel 196 also floats. While not visible, the embodiment 100 is moored to the seafloor, in the relatively shallow water 203 where the seafloor is being dredged, with anchors attached to the fore and aft ends of the embodiment, in order to stabilize its position and facilitate its receipt of CaCO3 from the dredging vessel.

Figure 11:
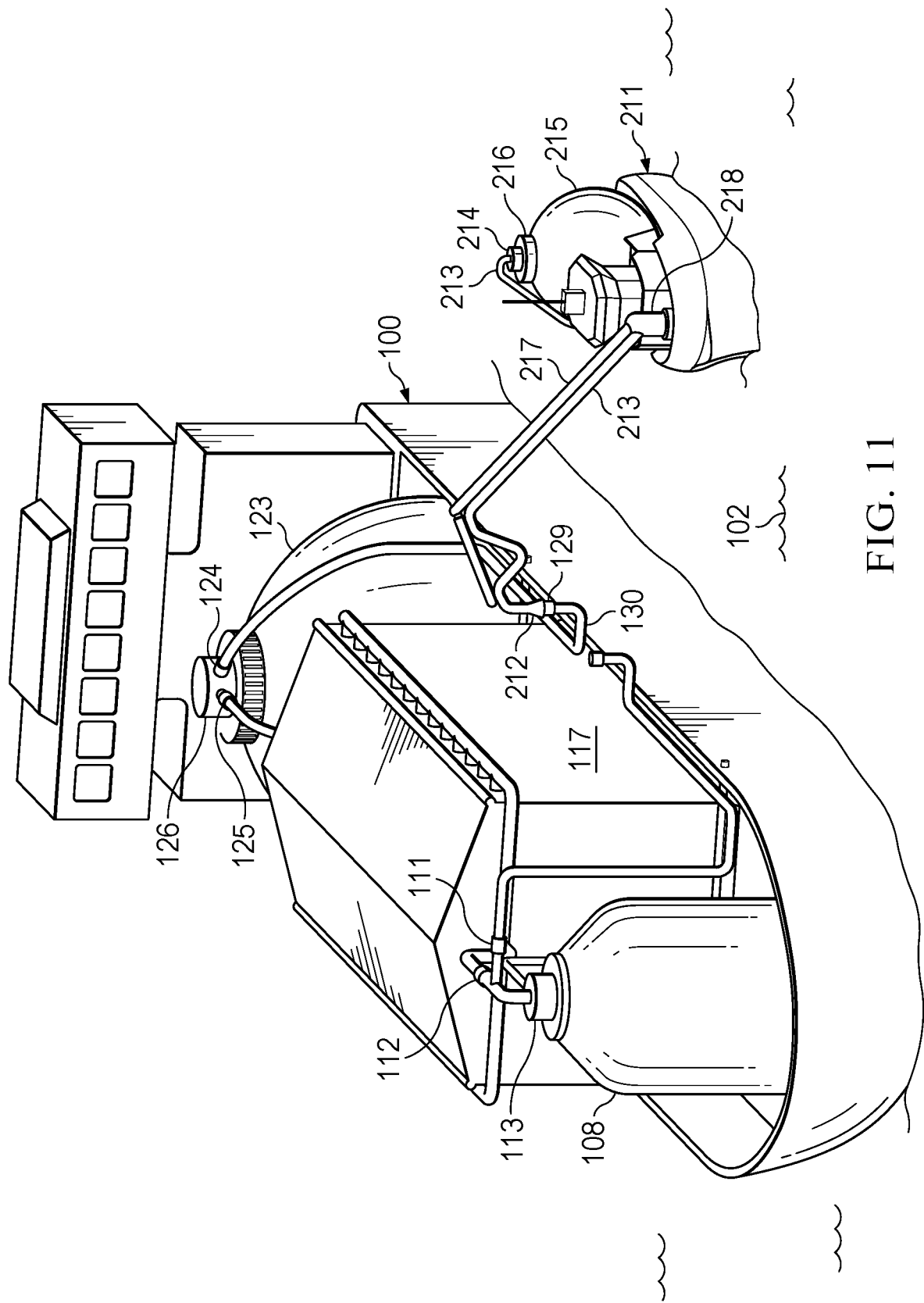
FIG. 11 is a perspective view an offloading of carbon dioxide from the first embodiment of the present disclosure.

FIG. 11 is a perspective view of the same embodiment 100 of the present disclosure illustrated in FIGS. 1-10. The embodiment illustrated in FIG. 11 is providing compressed CO2 gas to a "CO2 offloading vessel" 211. The embodiment is configured for CO2 offloading which includes, but is not limited to, the two following configurational states and/or conditions:

(1) CO2 generation is halted. CO2 generation is halted through and/or by a deactivation and/or de-energization of HCl pump 113 which prevents and/or precludes an introduction and/or spraying of HCl solution from within HCl tank 108 into an interior of the CaCO3 reaction chamber 117 and therein onto or into CaCO3 within that CaCO3 reaction chamber. Moreover, it is preferred that HCl tank outflow valve 112 be closed. And, HCl tank inflow valve 111 should already be closed as HCl solution is not being imported by the embodiment 100 in order to replenish the HCl solution stored within its HCl tank.

(2) The active and/or pumped removal of CO2 gas from an interior of the CaCO3 reaction chamber 117 is halted by a reconfiguring of the CO2 pump 126 to expel CO2 gas from its interior instead of to add additional CO2 gas to its interior. CO2 tank outflow valve 124 is opened in order to permit the out-pumped compressed CO2 gas to flow into and through CO2 offloading pipe 130, and therethrough to flow into, through, and out of, CO2 offloading valve 129, whereafter the compressed CO2 gas will tend to flow into CO2 receiving valve 212 and therethrough into and through CO2 receiving hose 213. During an offloading and/or transfer of compressed CO2 to another vessel, e.g. 211, CO2 tank inflow valve 125 is closed to prevent the pumped expulsion and/or out-pumping of compressed CO2 gas from the embodiment's CaCO3 reaction chamber 117 to flow into the CaCO3 reaction chamber and thereby increase the pressure of CO2 therein, at best wasting energy as that mis-directed CO2 would have to again be pumped from the CaCO3 reaction chamber and into the CO2 tank 123, and, at worst, exceeding the pressure tolerance of the CaCO3 reaction chamber causing CO2 to leak from that CaCO3 reaction chamber and perhaps permanently damaging the seals that are intended to prevent such leakages.

During an offloading of compressed CO2 to the CO2 offloading vessel 211, a CO2 receiving pump 214 is activated, actuated, and/or energized so that compressed CO2 gas flowing into and through CO2 receiving hose 213 is actively drawn into, further compressed if necessary, and then stored within a CO2 receiving tank 215 of the CO2 offloading vessel. A refrigeration apparatus 216 attached to the CO2 receiving tank of the CO2 offloading vessel cools the CO2 compressed within that CO2 receiving tank (e.g. as needed to prevent warming above a threshold temperature).

A boom arm 217 extending from the base 218 of a CO2 offloading crane onboard the CO2 offloading vessel 211 deploys, positions, and supports, the CO2 receiving hose 213 during the CO2 offloading vessel's offloading of compressed CO2 from the embodiment 100.

Figure 12:
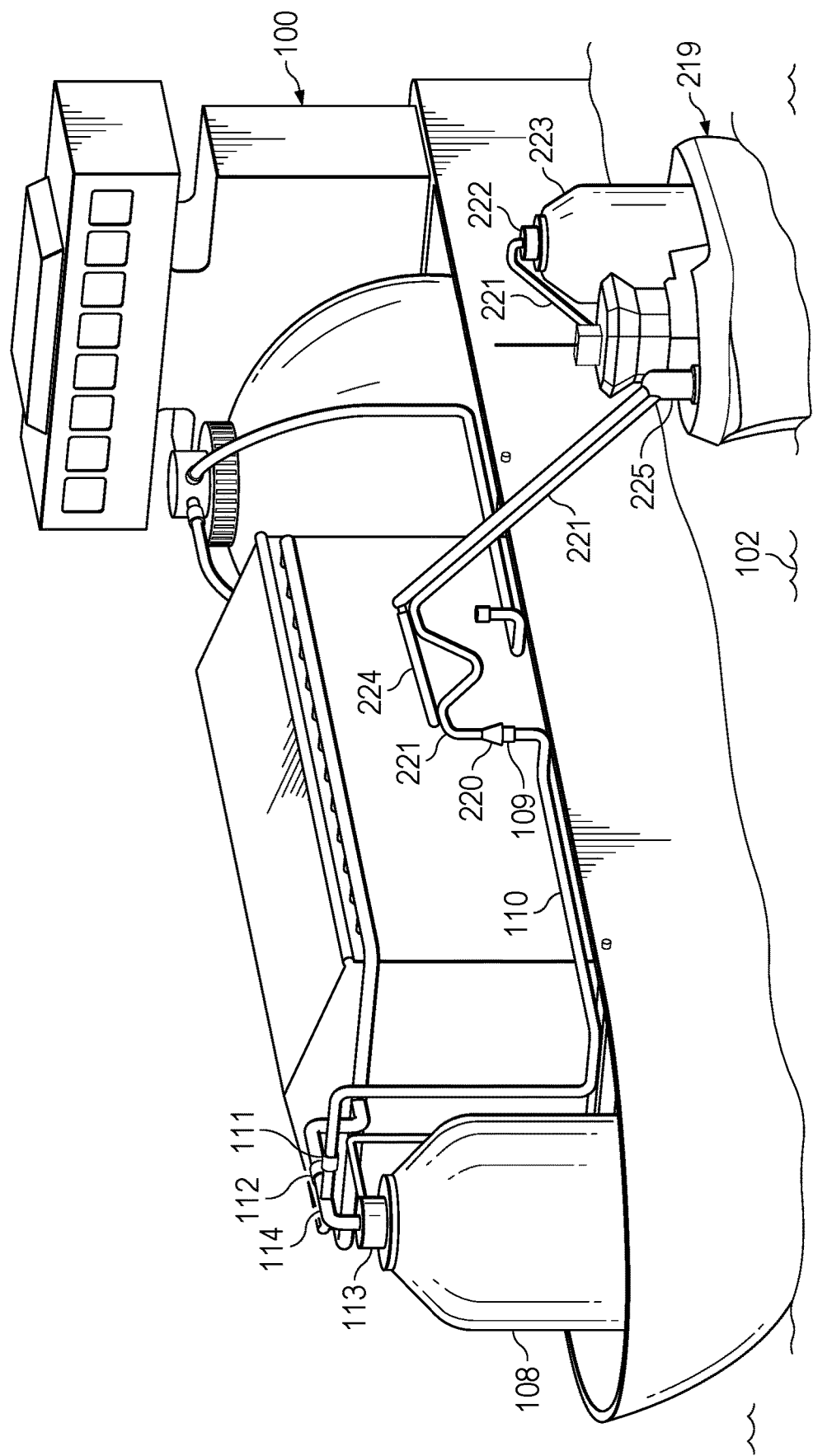
FIG. 12 is a perspective view an uploading of hydrochloric acid solution to the first embodiment of the present disclosure.

FIG. 12 is a perspective view of the same embodiment 100 of the present disclosure illustrated in FIGS. 1-11. The embodiment illustrated in FIG. 12 is receiving, and/or being resupplied with, HCl solution from and/or by an HCl resupply vessel 219. The embodiment is configured for HCl resupply and/or uploading which includes, but is not limited to, the three following configurational states and/or conditions:

(1) HCl pump 113 is configured to draw and/or suck HCl solution from HCl tank pipe 114 instead of its operational configuration wherein it pumps HCl solution from the HCl tank 108 and into the HCl tank pipe.

(2) HCl tank outflow valve 112 is closed so as to prevent the possibility of the HCl pump 113 sucking in CO2 from the spray heads (e.g. 146 in FIG. 8) that are fluidly connected to an interior of the CaCO3 reaction chamber 117.

(3) HCl tank inflow valve 111 is open to fluidly connect the HCl pump 113 with the HCl intake pipe 110 and the HCl receiving valve 109.

After the HCl resupply valve 220 connects to the HCl receiving valve 109, thereby fluidly connecting the HCl resupply hose 221 to the HCl intake pipe 110, the HCl resupply vessel 219 activates, actuates, and/or energizes, its HCl resupply pump 222, thereby pumping HCl solution from its HCl resupply tank 223 and into and through the HCl resupply hose, and therethrough into and through the HCl resupply valve 220 and the fluidly connected HCl receiving valve 109, and therethrough into and through HCl intake pipe 110, and therethrough into and through the HCl tank inflow valve 111, and into and through the HCl tank pipe 114, and into and through the HCl pump 113, and therethrough into an interior of the HCl tank 108—thereby resupplying the embodiment's 100 store of HCl solution, and providing the embodiment with additional HCl solution with which to continue its chemical conversion of CaCO3 to CO2.

The HCl resupply hose 221 of the HCl resupply vessel 219 is maneuvered into position (so that the HCl resupply valve 220 will connect to the HCl receiving valve 109), held in position, and supported as HCl solution is transferred from the HCl resupply vessel to the embodiment, by a boom arm 224 extending from the base 225 of an HCl resupply crane onboard the HCl resupply vessel.

We claim:

1. A carbon dioxide supply vessel, comprising:
a buoyant hull;
a propulsion system;
a reaction chamber adapted to confine calcium carbonate solids and a released gas during reaction of said confined calcium carbonate solids with an acid;
an acid supply tank adapted to store a hydrochloric acid solution;
an acid supply duct fluidly connecting the acid supply tank to the reaction chamber to convey said hydrochloric acid solution from the acid supply tank to the reaction chamber; and
a carbon dioxide tank in fluid communication with the reaction chamber via a discharge duct, said carbon dioxide tank configured to receive and store carbon dioxide gas released during said reaction.

2. The carbon dioxide supply vessel of claim 1, further including a carbon dioxide compressor configured to impel carbon dioxide from the reaction chamber through the discharge duct to the carbon dioxide tank.

3. The carbon dioxide supply vessel of claim 1, further including a carbon dioxide offloading port configured to facilitate transmission of the carbon dioxide stored in the carbon dioxide tank to an adjacent vessel.

4. The carbon dioxide supply vessel of claim 1, further comprising a hydrochloric acid spray nozzle disposed in the reaction chamber and adapted to disperse hydrochloric acid solution within the reaction chamber.

5. The carbon dioxide supply vessel of claim 1, further comprising hatch panels mounted to the reaction chamber and adapted to open and close to facilitate an addition of calcium carbonate to the reaction chamber.

* * * * *